Feb. 20, 1962 R. B. TREER 3,021,740
CONTOUR FOLLOWING APPARATUS
Filed July 22, 1954 7 Sheets-Sheet 2
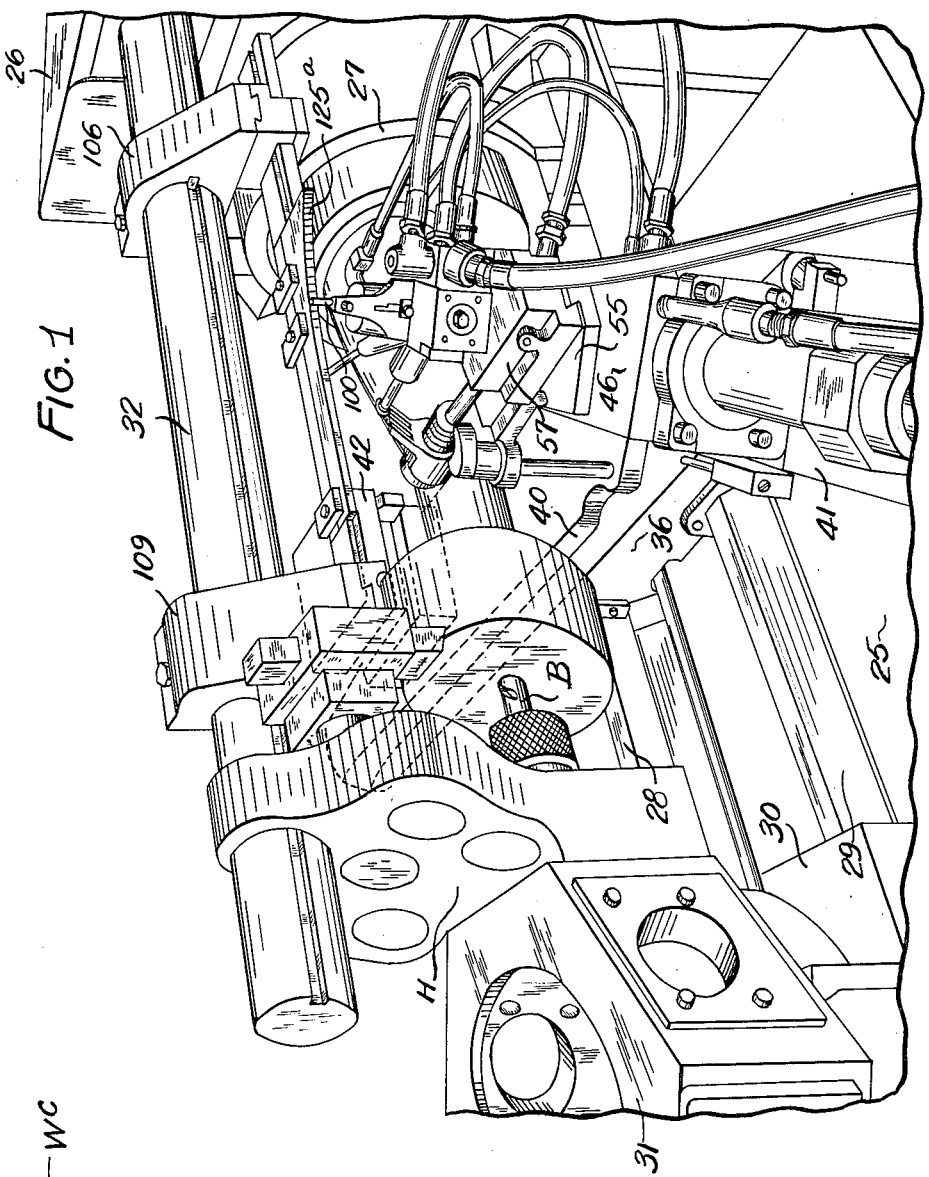
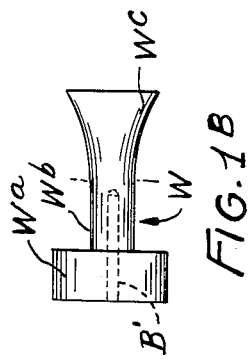
INVENTOR.
ROSS B. TREER
BY Hudson, Boughton,
Williams, David & Hoffmann
ATTORNEYS

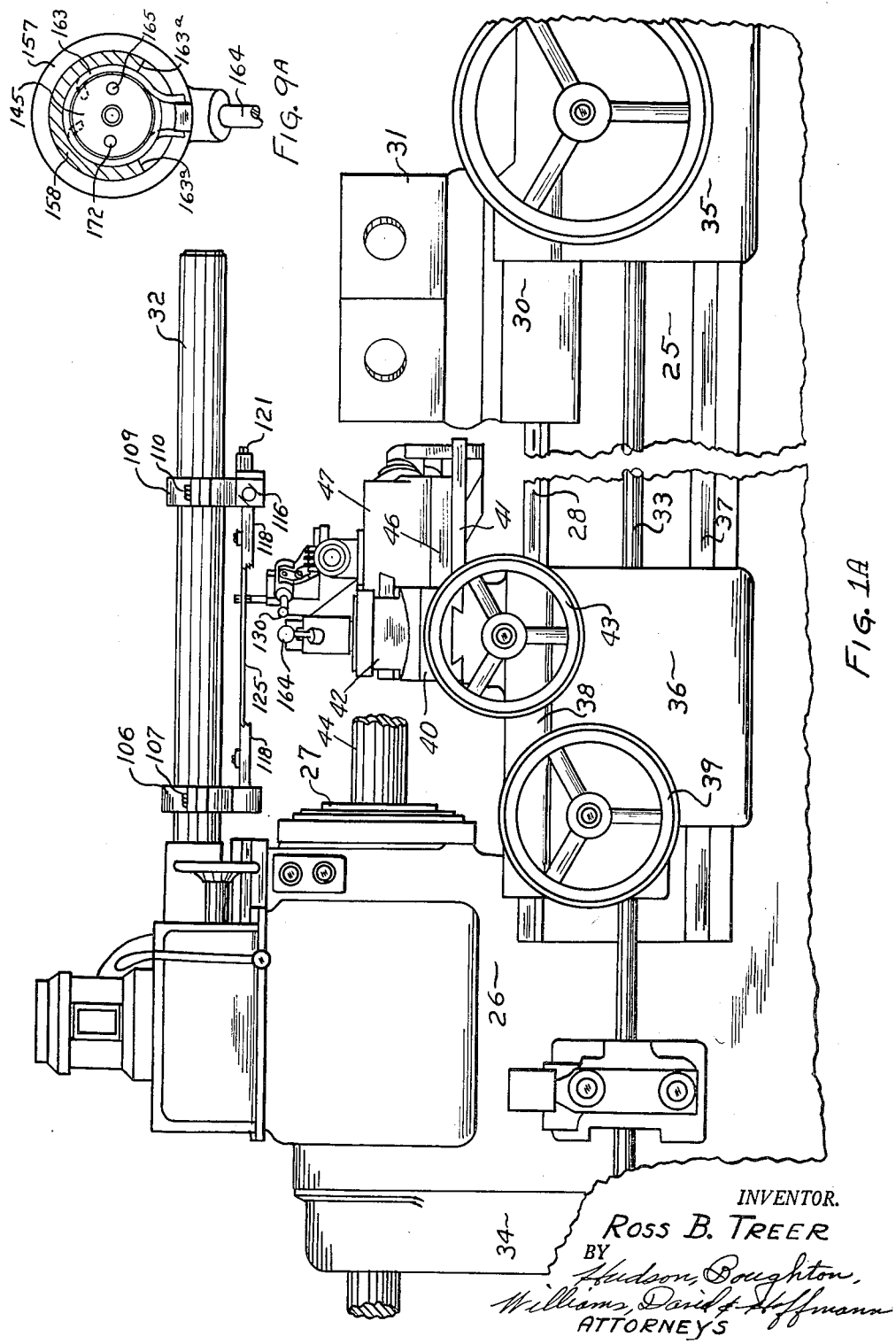

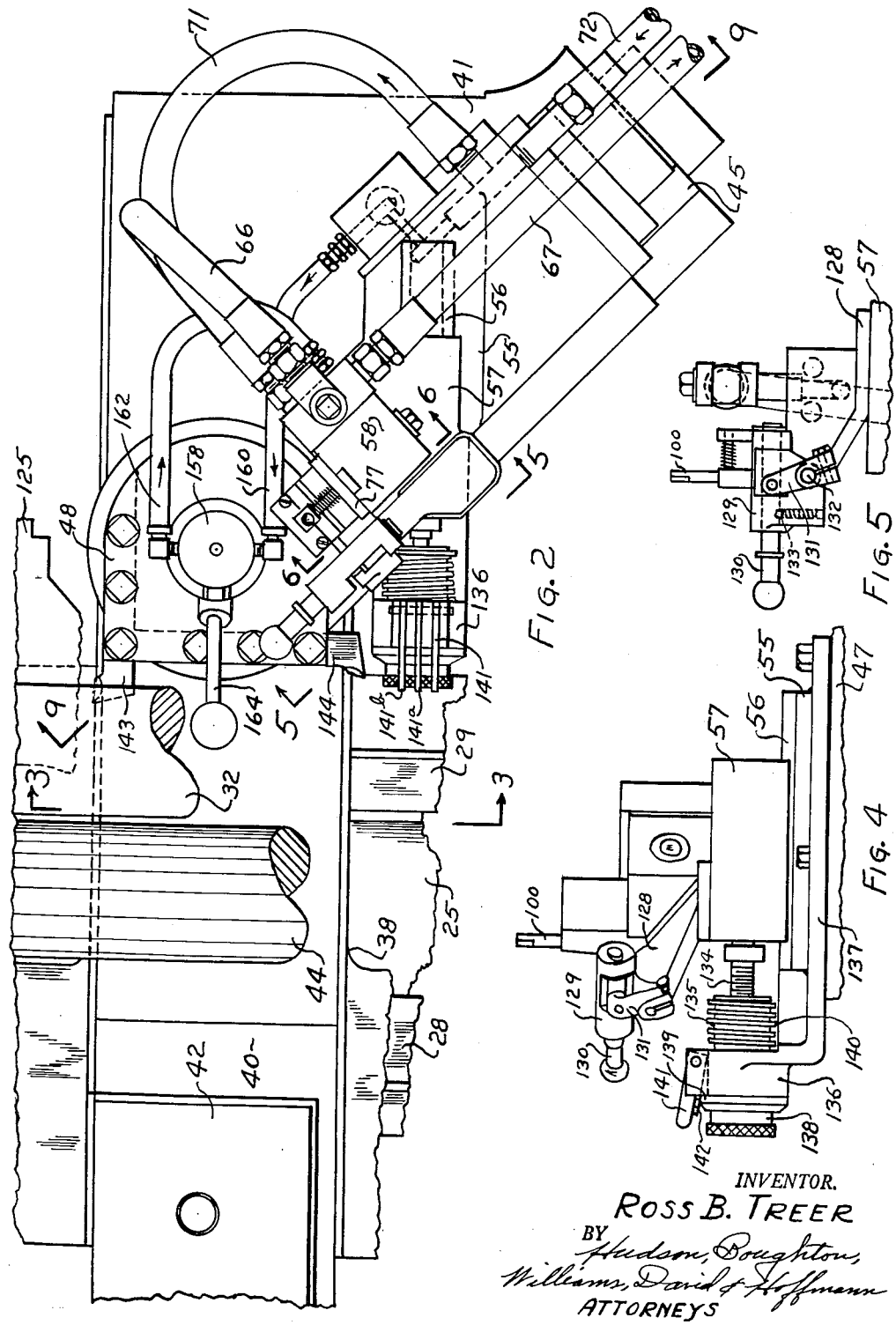

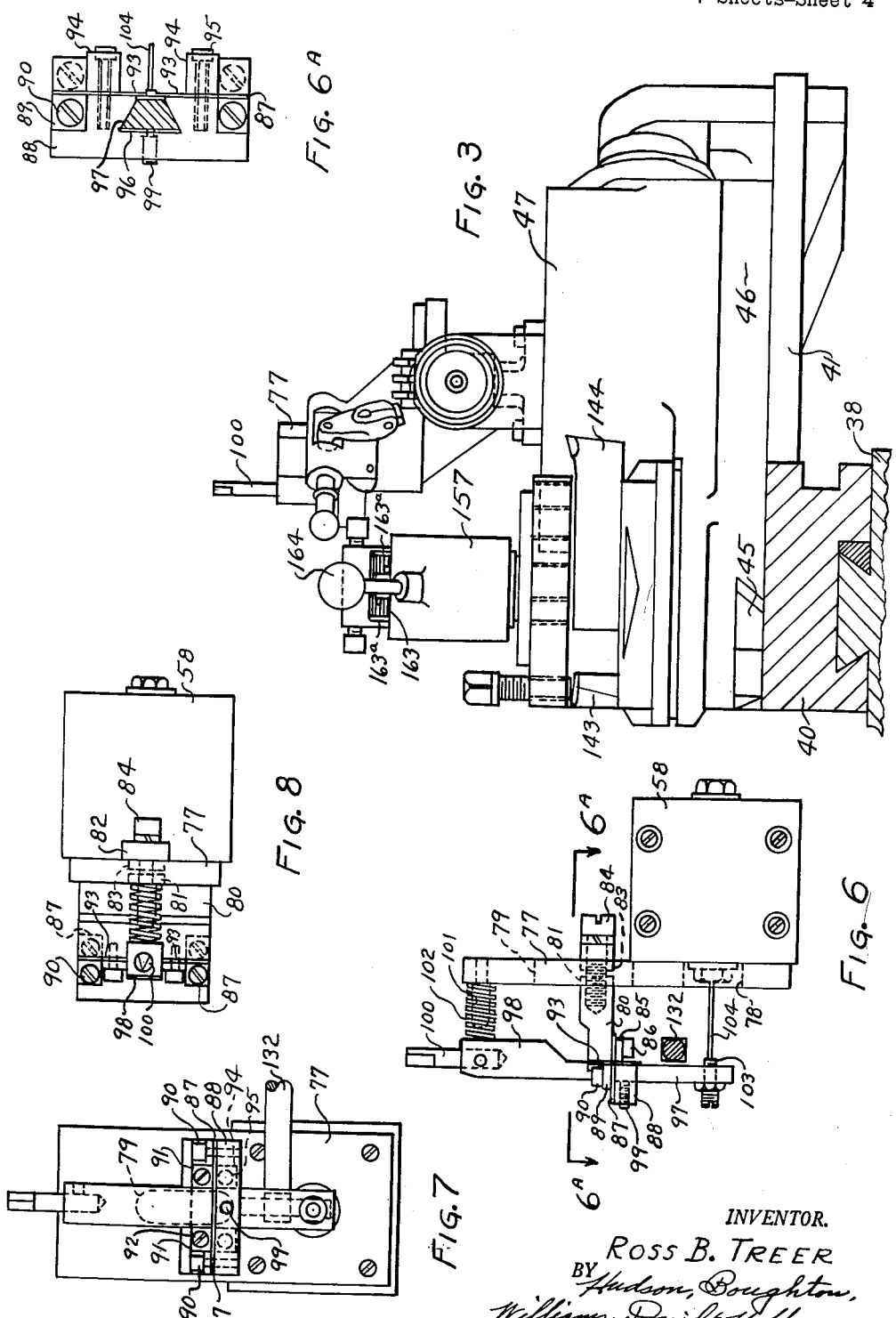

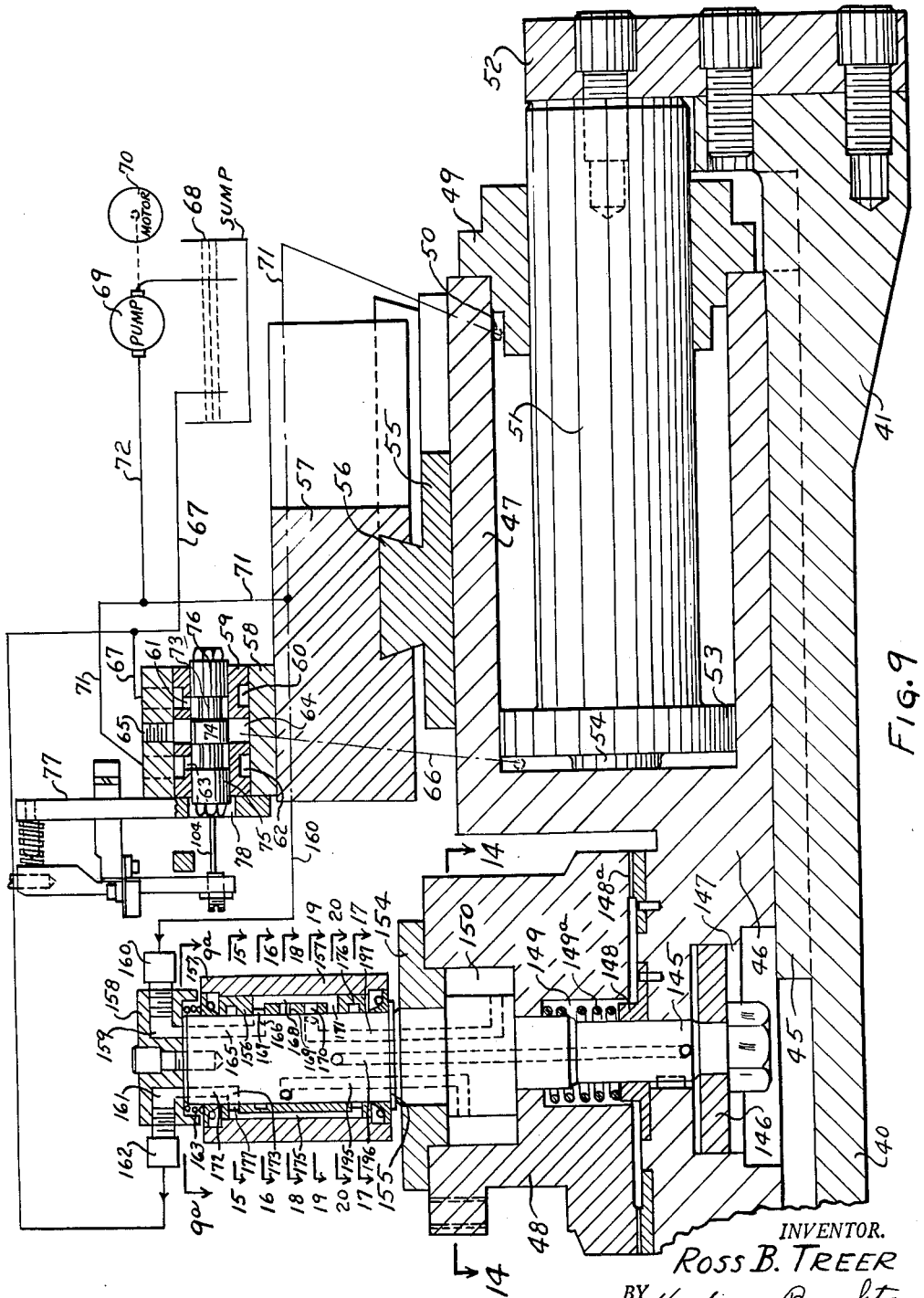

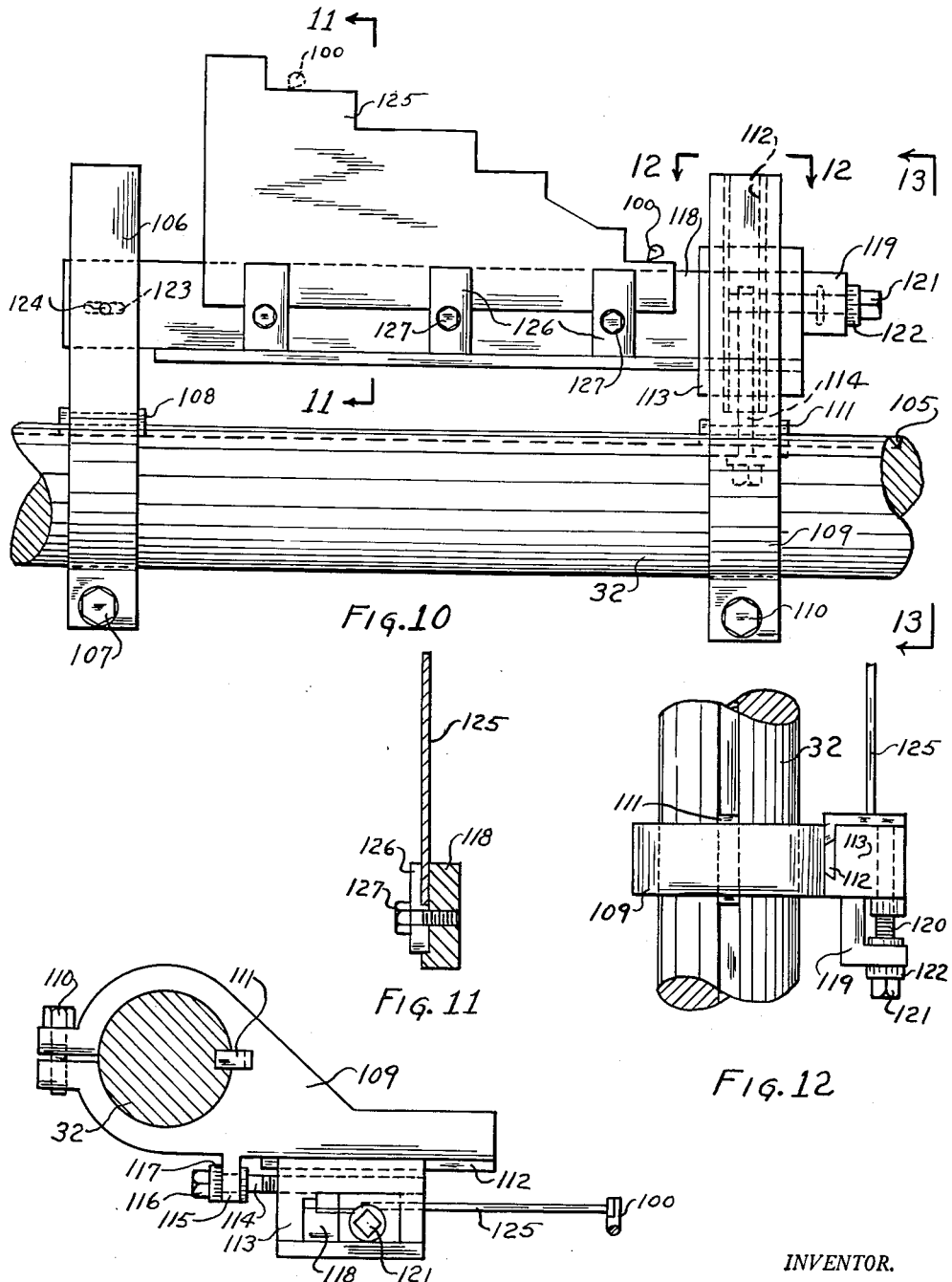

Feb. 20, 1962 R. B. TREER 3,021,740
CONTOUR FOLLOWING APPARATUS
Filed July 22, 1954 7 Sheets-Sheet 7

INVENTOR.
Ross B. Treer
BY
Hudson, Boughton,
Williams, Davis & Hoffmann
ATTORNEYS United States Patent Office 3,021,740
Patented Feb. 20, 1962

3,021,740
CONTOUR FOLLOWING APPARATUS
Ross B. Treer, Lakewood, Ohio, assignor to The Warner & Swasey Company, Cleveland, Ohio, a corporation of Ohio
Filed July 22, 1954, Ser. No. 445,036
13 Claims. (Cl. 82—14)

This invention relates to a machine tool for performing machining operations on a work piece, and more particularly to a new and improved former or pattern controlled contour machining apparatus which can be applied to a conventional machine tool.

An object of the invention is to provide a pattern or former controlled contour machining apparatus for a machine tool which can be readily installed on a conventional machine tool such as an engine or turret lathe with a minimum amount of alteration of the machine tool.

Another object is to provide a former or template controlled contour machining apparatus for a conventional machine tool which is so constructed that both contouring machining operations and the usual machining operations can be performed on the work piece by the machine tool.

An additional object is to provide a template or pattern controlled contouring apparatus for a machine tool which is so constructed that, in addition to the contouring machining operations performed by cutting tools mounted on the apparatus, the usual machining operations can be performed by cutting tools on the conventional front cross slide of the machine tool before or after the contouring operations or by cutting tools on the indexible turret before or after or simultaneously with the contouring operations.

A still further object is to provide a template or pattern controlled contour machining apparatus for a machine tool and wherein the template or pattern or former is supported by the conventional overhead pilot bar of the machine tool and which pilot bar can still function in its usual manner either without removing the template or pattern therefrom or, if necessary, by removing the same from the pilot bar depending upon the character of the work piece.

Another object is to provide a pattern or template controlled contour machining apparatus for a machine tool as referred to in the last object and wherein the template, pattern or former is adjustably supported by the conventional overhead pilot bar.

Another object is to provide a template or former controlled contour machining apparatus for a turret lathe and which is so constructed and arranged on the turret lathe that when the apparatus is performing contouring machining operations on the work piece the tools carried by the indexible hexagonal turret can be performing machining operations on the work piece at the same time or when the contouring apparatus is not being employed for contouring operations then the usual machining operations can be performed by tools carried by the front cross slide and the indexible hexagonal turret.

A still further object is to provide a former or pattern controlled contour machining apparatus for a machine tool such as a turret lathe and wherein the overhead pilot bar performs the dual function of supporting the template or pattern of the apparatus and of supporting or steadying the tools carried by the indexible hexagonal turret during the working operation of said tools.

Still another object is to provide a template or pattern controlled contour machining apparatus for a machine tool that is so constructed that the slide of the apparatus carrying the contouring cutting tool moves in a path such that the stylus or follower can operate most efficiently with the template or pattern.

Still another object is to provide a pattern or template controlled contour machining apparatus for a machine tool and which includes improved and novel pivotal mounting for the template or pattern follower or stylus whereby the stylus or follower fulcrums on an accurately determined center without friction losses and has an accurate cooperating engagement with the template providing sensitive, efficient and accurate control of the slide which carries the contouring cutting tool.

A still further object is to provide a pattern or template controlled contour machining apparatus for a machine tool which includes novel and efficient means for manually disengaging the follower or stylus from the template for quick return and approach movements of the slide carrying the contouring cutting tool from and to machining position.

A still further object of the invention is to provide in a former or pattern controlled contour machining apparatus for a machine tool novel mechanism for adjusting the cutting movements of the slide carrying the contouring cutting tool for varying diameters of work pieces.

A still further object of the invention is to provide in a pattern or former controlled contour machining apparatus for a machine tool novel and efficient means for taking a successive number of roughing cuts and then a finishing cut in the work piece all under control of the template or pattern and the follower or stylus cooperating with the latter.

Another object of the invention is to provide a pattern or template controlled contour machining apparatus for a machine tool which includes an indexible contour cutting tool holder mounting a plurality of cutting tools as, for instance, a roughing cutting tool and a finishing cutting tool.

A still further object is to provide in a template or pattern controlled contour machining apparatus for a machine tool as referred to in the last mentioned object improved and novel power actuated and controlled mechanism for indexing the contour cutting tool holder and for locking the same in indexed position so that the various tools carried by the holder can be moved into cutting position successively as required.

Further and additional objects and advantages not hereinbefore specified will become apparent hereinafter during the detailed description of an embodiment of the invention which is to follow and which embodiment is illustrated in the accompanying drawings forming a part of this specification and wherein, FIG. 1 is a perspective view of a turret lathe embodying the invention and having arranged thereon the pattern or template controlled contouring machining apparatus and is taken from the rear of the lathe from adjacent the turret slide and indexible hexagonal turret and looking toward the headstock and shows a portion of the turret slide and indexible turret with a tool holder secured on one face of the latter and cooperating with the pilot bar, the front tool holder on the cross slide, the contour slide and its associated mechanism on the rear angular extension of the cross slide, the pilot bar and template support carried thereby, the template, a portion of the headstock and a workpiece carried by the work spindle and which is machined by tools carried by the front or square tool holder on the cross slide, by the tool holder on a face of the turret and which cooperates with the pilot bar and by the tool holder on the contour slide.

FIG. 1a is a front elevational view of the machine tool shown in FIG. 1.

FIG. 1b is a detached elevational view of the workpiece carried by the work spindle and being machined in the turret lathe as shown in FIG. 1.

FIG. 2 is a top plan view of that portion of the machine tool shown in FIG. 1a which includes the contour machining apparatus embodying the invention with certain of the parts of the machine tool being broken away.

FIG. 3 is a partial section and partial elevation taken substantially on line 3—3 of FIG. 2 looking in the direction of the arrows.

FIG. 4 is a fragmentary elevational view of that portion of the apparatus embodying the invention which includes the arrangement for adjusting the relationship of the stylus or follower with respect to the slide of the apparatus that carries the contour cutting tool.

FIG. 5 is a fragmentary elevational view taken substantially from line 5—5 of FIG. 2 looking in the direction of the arrows.

FIG. 6 is a partial section and partial elevation taken substantially from line 6—6 of FIG. 2 looking in the direction of the arrows.

FIG. 6a is a sectional view taken substantially on line 6a—6a of FIG. 6 looking in the direction of the arrows.

FIG. 7 is an end elevational view taken from the left hand side of FIG. 6.

FIG. 8 is a plan view taken from the top or upper side of FIG. 6.

FIG. 9 is an irregular sectional view taken approximately along irregular line 9—9 of FIG. 2 looking in the direction of the arrows and illustrating schematically the hydraulic circuits used in the apparatus.

FIG. 9a illustrates the rat trap spring and stop arrangement for normally maintaining the lever of the control valve for the indexible tool holder in central position and is taken approximately on line 9a—9a of FIG. 9.

FIG. 10 is a fragmentary top plan view of the pilot bar with the template or pattern mounted thereon so as to be adjustable relative thereto.

FIG. 11 is a sectional view taken substantially on line 11—11 of FIG. 10 looking in the direction of the arrows.

FIG. 12 is a fragmentary rear elevational view taken from line 12—12 of FIG. 10 looking in the direction of the arrows.

FIG. 13 is a partial section and partial elevation taken from line 13—13 of FIG. 10 looking in the direction of the arrows.

FIG. 14 is a sectional view through the pressure fluid operated motor for indexing the tool holder carrying the contour cutting tools and is taken substantially along line 14—14 of FIG. 9 looking in the direction of the arrows.

FIG. 15 is a sectional view taken on line 15—15 of FIG. 9 and through the control valve that controls the pressure fluid operated motor and the indexible tool holder.

FIG. 16 is a sectional view through the control valve taken substantially on line 16—16 of FIG. 9.

FIG. 17 is a sectional view through the control valve taken substantially on line 17—17 of FIG. 9.

FIG. 18 is a sectional view through the control valve taken substantially on line 18—18 of FIG. 9 and shows the valve parts in one relationship, i.e., the central position of the valve housing and valve sleeve.

FIGS. 18a and 18b are views similar to FIG. 18 but show the valve parts in two different relationships from the one illustrated in FIG. 18, i.e., the relationship they have when the valve housing and the valve sleeve have been rotated from central position counterclockwise and clockwise respectively.

FIG. 19 is a sectional view taken substantially on line 19—19 of FIG. 9 through another portion of the control valve and shows the relationship of the parts of said valve in this plane when the valve housing and sleeve are in central position.

FIGS. 19a and 19b are similar to FIG. 19 but illustrate the relationships which the parts of the valve have when the valve housing and sleeve have been rotated in one or the other direction.

FIG. 20 is a sectional view through the control valve taken substantially on line 20—20 of FIG. 9 and shows the relationship of the valve parts in the plane of the section when the valve housing and sleeve are in central position, and FIGS. 20a and 20b are views similar to FIG. 20 but illustrate the relationship of the valve parts in the plane of the section when the valve housing and sleeve have been rotated in one or the other direction.

The template or pattern controlled contour machining apparatus embodying the invention will be described herein for purposes of illustration as applied to a turret lathe having an indexible hexagonal turret and an indexible square turret with which it has particular utility but it will be understood that the apparatus also could be applied to an engine lathe or other types of machine tools.

A turret lathe is shown in perspective in FIG. 1 and in front elevation in FIG. 1a and comprises the usual bed 25 having at one end the headstock 26 which mounts the rotatable work spindle 27 and the change speed driving transmission to the work spindle, not illustrated, since it is well understood in the art and forms no part of the present invention.

The bed 10 on its upper side is provided with horizontally extending front and rear ways 28 and 29, see FIG. 2. The ways 28 and 29, as is well known, are parallel to each other and to the axis of the work spindle. The ways slidably support the usual turret saddle 30 provided with an indexible hexagonal turret 31 which mounts on its various faces tool holders indexible therewith and provided with cutting tools and which tool holders may cooperate in the conventional manner with the usual overhead pilot bar 32 carried by the headstock.

A feed shaft 33 extends along the front of the bed 25 from a gear box 34 having the usual change speed gearing that operatively connect the feed shaft to the work spindle so that the feed shaft can be rotated in timed relationship to the work spindle. The feed shaft 33 extends into the apron 35 for the turret saddle and is operatively connected to a drive train for moving the turret saddle longitudinally of the bed as will be well understood.

The feed shaft 33 also passes through the apron 36 for the cross slide carriage as is well understood and is operatively connected to the carriage and cross slide actuating mechanism. Usually the apron 36 for the cross slide carriage is bolted or otherwise connected to a cross slide carriage supported only on the front way 28 of the bed while the lower end of the apron 36 is slidably supported by a way 37 located on the front side of the bed and below the feed shaft 33. Usually the cross slide carriage slidably supports a front cross slide for movement transversely of the bed. The description thus far set forth is of a conventional turret lathe. The template or pattern controlled contour machining apparatus embodying the invention will now be described.

The apparatus comprises in place of the usual cross slide carriage supported only by the front way 28 an elongated carriage 38 slidably supported by both the front way 28 and the rear way 29. The front end of the carriage 38 and the upper end of the apron 36 can be bolted or otherwise secured together as in the case of the usual cross slide carriage and apron previously described. The carriage 38 can be moved longitudinally of the bed on the ways 28 and 29 in the usual manner of cross slide carriages as, for instance, by the manual rotation of the hand wheel 39 on the apron 36 or by being operatively connected to the feed shaft 33 as is well known in the art.

The carriage 38 on its upper side is provided with a dove tail way which slidably supports the cross slide 40 which extends from beyond the front of the front way 28 to rearwardly of the rear way 29 and has at its rear end a laterally offset portion 41. The cross slide 40 adjacent its front end mounts the usual indexible square turret 42 which mounts, in turn, on its different faces cutting tools, wherefore the cross slide 40 can be used in the usual manner for machining operations usually performed by the cross slide of a turret or engine lathe.

The cross slide 40 may be power operated from the feed shaft 33 or it may be manually operated by means of the hand wheel 43 as is well known and, hence, need not be illustrated. As is usual in machine tools of the lathe type the cross slide can be clamped to the carriage in various positions where it is desired to take longitudinal turning cuts along the work piece 44 mounted in the chuck of the work spindle 27.

The cross slide 40 and the offset portion 41 thereof have on their upper surface a dovetail way 45 see FIG. 3 which extends angularly to the axis of the work spindle, in this instance at an angle of 45° to said axis. The way 45 slidably supports the contour slide 46 which carries the contouring cutting tools. The contour slide 46 includes a cylinder 47 which is illustrated as formed integral with the slide. The contour slide 46 at its inner end mounts an indexible tool holder 48 later to be referred to and which tool holder, in turn, may mount a plurality of contouring cutting tools as, for example, roughing and finishing tools which will later be referred to.

The bore of the cylinder 47 is dead-ended at one end while the opposite end of said bore is closed by a closure plug 49 extending into the bore of the cylinder and being reduced in diameter at its inner end to provide an annular space 50 for a purpose later to be explained. The plug 49 is provided with a central machined bore in which a piston rod 51 has a slidable fit. The piston rod 51 extends outwardly of the plug 49 and is fixedly secured to an end plate 52 which is also bolted to the offset portion 41 of the cross slide and hence the piston rod 51 is fixed with respect to the cross slide.

The piston rod 51 at its inner end is provided with a piston head 53 slidable in the bore of the cylinder 47. The piston head 53 on the side thereof opposite to the piston rod 51 is provided with an axial boss 54 which engages the dead end of the bore of the cylinder 47 to positively stop rearward relative movement between the piston head and the cylinder and also to provide a clearance between the dead end of the bore of the cylinder and the piston head so that pressure fluid can be introduced therebetween.

Relative movement between the piston head 53 and the cylinder 47 in the opposite direction, i.e., the forward direction, is positively stopped when the piston head 53 engages the inner end of the plug 49, it being recalled that the annular space 50 provides for the introduction of pressure fluid into the cylinder, bore even when the piston head is abutting the plug 49. It will be seen that differential pressure areas are provided on opposite sides of the piston head 53, with the larger pressure area being on that side of the head containing the boss 54 for a purpose later to be described.

The contour slide 46 on the upper side of the cylinder 47 has fixed thereto a supporting plate 55 provided on its upper surface with a dovetail way 56 extending transversely of the dove-tail way 45 at substantially a 45° angle thereto or extending parallel to the transverse feeding movement of the cross slide 40.

A valve housing and follower or stylus supporting slide 57 is slidably mounted on the way 56, see FIGS. 2 and 9. The slide 57 on its upper side mounts a valve housing 58 which is provided with a through bore mounting, in turn, a valve casing 59. The valve casing 59 is provided in its circumference and adjacent one end with an annular groove 60 which communicates by means of a port 61 with the cylindrical bore through the valve casing. The valve casing 59 adjacent its opposite end is provided on its circumference with a cylindrical groove 62 that is in communication with the bore through the valve casing by means of a port 63. Actually the valve casing 59 as illustrated is formed of two separate portions which are pressed into the bore of the valve housing 58 from the opposite ends thereof and which portions are separated at their inner ends to provide an annular space 64 which communicates with a port 65 formed in the valve housing 58. The port 65 is in constant communication with the dead end of the bore in the cylinder 47 by means of a conduit 66 indicated schematically in FIG. 9 by dot and dash lines. The annular groove 60 in the valve casing 59 is connected by means of a drain conduit 67 extending to the sump 68 of a pump 69 that may be operated by a motor 70. The sump, pump and motor are located, of course, beneath the bed of the machine tool or in any other suitable location as will be well understood. The annular groove 62 in the valve casing 59 is connected by a conduit 71 to the annular space 50 between the inner end of the plug 49 and the wall of the bore of the cylinder 47. The conduit 71 is always connected to the output side of the pump 69 by a conduit 72, wherefore the annular space 50 is subjected at all times to maximum pump pressure.

A slidable valve body 73 is mounted in the bore of the valve casing 59 and said valve body 73 is provided with a central cylindrical land 74 slidable in the bore of the valve casing and with wider end cylindrical lands 75 and 76 spaced from the central land and located adjacent each end of the valve body.

When the valve body 73 is in its central position the central land 74 seals off the annular space 64 of the valve and hence the dead end of the bore in the cylinder 47, it being recalled that the dead end of the bore is on the large area side of the piston head 53. At this time the annular groove 62 of the valve casing through the port 63 communicates with the space between the central land 74 and the end land 75 of the valve body and is subject to full pump pressure. Also at this time the annular groove 60 in the valve casing 59 through the port 61 communicates with the space between the central land 74 and the end land 76 of the valve body and is connected to drain. It will be seen that if the valve body 73 is shifted toward the right, as viewed in FIG. 9, a distance so that the central land 74 uncovers a portion of the annular space 64 while the port 63 is not completely covered by the end land 75 then full pump pressure can flow from the annular groove 62 through the port 63 into the space 64 and through the conduit 66 to the inner end of the bore of the cylinder 47 and acts on the large area surface of the piston head 53 to move the contour slide 46 inwardly or forwardly toward the work it being understood that at this time the small area side of the piston head 53 is also subject to full pump pressure, but due to the differential pressure areas the forward movement of the slide occurs.

If the valve body 73 is shifted from its central position shown in FIG. 9 toward the left as viewed in said figure so that the central land 74 uncovers a portion of the annular space 64 while the end land 76 does not completely cover the port 61, then it will be seen that the annular space 64 is connected with the annular groove 60 of the valve and through the conduit 67 with drain and this results in connecting the inner end of the bore of the cylinder 47 with drain so that a drop in pressure occurs on the large area side of the piston head 53, whereupon the contour slide 46 will move rearwardly due to the full pump pressure on the small area side of the piston head 53.

The valve housing 58 has secured to its left hand end as viewed in FIGS. 6 and 9, a vertically extending supporting plate 77 and said plate is provided adjacent its lower end with an opening 78 concentric with the axis of the valve body 73 and into which opening the left hand end of the valve body can move with clearance.

The supporting plate 77 above the opening 78 for the valve body is provided with a vertically elongated centrally located opening 79. A supporting bracket arm 80 extends outwardly from the left hand side of the plate 77 as viewed in FIG. 6 and extends substantially the horizontal width of the plate 77. The bracket arm 80 has a key portion 81 interfitting the slot 79 and said key portion 81 and bracket arm are provided with a threaded opening located centrally of the key portion.

The bracket arm 80 is clamped in position on the plate 77 by a clamping block 82 having a similar key portion 83 interfitting the slot 79. The clamping block 82 is located on the opposite side of the plate 77 from the bracket arm 80 and the key portions 81 and 83 on the bracket arm and block are aligned but slightly spaced apart when said bracket arm and block are clamped together by a clamping screw 84 mounted in an opening in the block 82 and key 83 and screwed into the threaded opening in the key 81 of the bracket arm 80.

It will be seen that the bracket arm 80 can be clamped to the plate 77 in different adjusted positions within the limits of the slot 79 and also that when so clamped it will be held against turning movement due to the engagement of the key 81 with the walls of the slot 79.

The outer or free end of the bracket arm 80 is of reduced vertical thickness as clearly indicated in FIG. 6. The outer or free end of the bracket arm 80 adjacent its opposite edges has a pair of clamping shoes 85 secured to its underside by screws 86 with the clamping shoes 85 clamping one end of a strip of flexible material between the shoes and the underside of the bracket arm. The strips of flexible material just referred to are indicated at 87 and extend outwardly beyond the free end of the bracket arm 80. The outer ends of the strips 87 overlie a horizontal bar 88 and are clamped to the upper side of said bar by clamping shoes 89 and screws 90. Above the bar 88 are clamping shoes 91 similar to the clamping shoes previously referred to and which by means of screws 92 extending into the free end of the bracket arm 80 clamp to said end of the bracket arm a vertically disposed horizontally extending flexible strip 93.

The lower portion of the strip 93 extends across the adjacent side of the bar 88 and is clamped thereto by clamping shoes 94 and screws 95 similar to the clamping shoes and screws previously described. The flexible strip 93 extends between the flexible strips 87. The flexible strips 87 and 93 may be formed of any suitable flexible material and are preferably flexible metal strips being formed, for example, of beryllium copper, Phosphor bronze or any other suitable material.

The bar 88 is provided with a dovetail vertically extending slot 96 adjacent to the flexible strip 93 (see FIG. 6a). This dovetail slot receives the reduced lower end 97 of a feeler arm 98. The reduced lower end 97 of the feeler arm 98 in cross section substantially fills the dovetail slot 96 in the bar 88 and said feeler arm can be secured to the bar 88 by a setscrew 99 threaded in the bar and having its inner end contacting the reduced lower end 97 of the feeler arm and acting to wedge the lower end 97 into the dovetail groove 96.

It will be seen that the feeler arm 98 is pivotally supported from the bracket arm 80 by the flexible strips 87 and 93 and by the bar 88 so that said feeler arm can fulcrum or rock at a point midway of the upper and lower edges of the strip 93 and midway between the inner sides of the strips 87. The feeler arm 98 is thus pivotally mounted to rock on an accurately determined center and without frictional losses and without any wear, it being understood that the minute flexing of the strips 87 and 93 is well within the elastic limits of the material and produces no fatigue therein.

The upper end of the feeler arm 98 has secured in it a vertically extending feeler or stylus 100 which engages with the pattern or template later to be referred to.

The upper end of the supporting plate 77 mounts a supporting pin 101 projecting toward the feeler arm 98 and supporting a coil spring 102, one end of which abuts the plate 77 and the opposite end of the feeler arm 98. The purpose of the spring 102 is to move the stylus or feeler 100 in a direction toward the template or pattern.

The lower end of the reduced portion 97 of the feeler arm 98 has secured therein a threaded bushing 103 in substantial axial alignment with the opening 78 in the lower end of the supporting plate 77. A flexible wire 104 has one of its ends secured to the bushing 103 and its opposite end secured to the left hand end of the slidable valve body 73 as viewed in FIGS. 6 and 9.

It will be seen that the bracket arm 80 during assembly on the plate 77 can be adjusted as to location within the limits of the slot 79 and it will also be seen that the position of the feeler arm 98 can be adjusted relative to the bar 88 and clamped by the screw 99 in such adjusted position to facilitate the assembly of the feeler arm in the bar and to provide the proper ratio of movement between the feeler 100 and the sliding valve body 73.

It will also be seen that the sliding valve body 73 will be highly sensitive to slight rocking movements of the feeler arm 98 and feeler 100 to vary the location of the lands 74, 75 and 76 of the valve body to effect the supply or the exhaust of pressure fluid to or from the large piston area side of the piston head 53.

As already stated, the stylus or feeler 100 at the upper end of the feeler arm 98 is adapted to cooperate with the contour of a template or pattern. This template or pattern may be supported in any suitable way but preferably it is supported by the overhanging pilot bar 32 which thus serves the dual purpose of supporting the pattern or template and of steadying the tool holders mounted on the faces of the indexible hexagonal turret during the cutting operation of the cutting tools carried by such holders.

The pilot bar 32 is provided with a longitudinally extending spline groove 105 at the rear side of the pilot bar, see FIG. 10, which is a top plan of the pilot bar shown in FIG. 1A. A supporting strap or bracket 106 has a split cylindrical portion fitting over the pilot bar 32 and which can be clamped to the pilot bar by a clamping bolt 107.

A key 108 located in the spline groove 105 of the pilot bar and in a groove formed in the strap or bracket 106 holds the bracket against rotation with respect to the pilot bar although the bracket can be moved longitudinally of the pilot bar by loosening the bolt 107 and sliding the bracket therealong.

A second bracket 109 is provided with a split cylindrical portion fitting the pilot bar 32 while a bolt 110 serves to clamp the cylindrical portion of the bracket 109 to the pilot bar. A key 111 extending into the spline groove 105 and into a keyway in the bracket 109 prevents the bracket from turning relative to the pilot bar but allows endwise adjusting or shifting movement of the bracket on the pilot bar.

The brackets 106 and 109 extend rearwardly from the pilot bar in parallel relationship to each other. The bracket 109 along its lower edge is provided with a dovetail guide 112 which is received in a dovetail groove formed in the upper side of a slide 113 so that said slide is adjustably supported by the bracket 109. An adjusting screw 114 is threadedly connected to the slide 113 and said screw rotates in a depending lug 115 formed on the underside of the bracket 109 but is held against endwise movement relative to said lug.

It will be seen that rotation of the screw 114 by a wrench applied to the square head 116 thereof effects adjustment of the slide 113 longitudinally of the bracket arm 109 and transversely of the pilot bar. The screw 114 intermediate the lug 115 and the head 116 may have fixed thereto a dial ring 117 to indicate the adjusted position of the slide 113.

The slide 113 is provided with an opening into which extends one end of a template or pattern supporting bar 118 that extends longitudinally of the pilot bar 32 and transversely of the direction of adjusting movement of the slide 113. The bar 118 has an extended L-shaped end portion 119 projecting beyond the slide 113 and rotatably supporting an adjusting screw 120 which is threadedly connected with the slide 113. The screw 120 is held against endwise movement relative to the portion 119, wherefore turning of the screw by a wrench applied to the square head 121 thereof effects movement of the pattern or template supporting bar 118 transversely relative to the slide 113 and longitudinally of the pilot bar 32, it being recalled that the turning of the screw 114 by the head 116 effects adjusted movement of the slide 113 in a direction transversely of the pilot bar 32.

The screw 120 intermediate the portion 119 and the head 121 may have fixed thereto a dial ring 122 to indicate the adjusted position of the bar 118 longitudinally of the pilot bar. The opposite end of the template or pattern supporting bar 118 extends into an opening in the bracket 106 and is provided with a longitudinally elongated slot 123 which receives a pin 124 carried by the bracket 106, thus forming a floating pivotal connection between the bracket 106 and the bar 118 which permits movement of the bar 118 longitudinally of the pilot bar 32 and rocking movement of the bar 118 relative to the pilot bar.

It will thus be seen that turning of the screw 114 effects adjustment of the bar 118 into parallelism with the pilot bar 32 while turning of the screw 120 effects longitudinal movement of the bar 118 relative to the pilot bar 32 to position the template or pattern carried by the bar 118 in correct relationship to the contouring cutting tool carried by the slide 46.

The template or pattern is indicated at 125 and the inner edge of this template or pattern is clamped to the bar 118 by a number of clamping shoes 126 secured to the bar 118 by screws 127. The clamping shoes 126 are held against turning relative to the bar 118 by their engagement with a longitudinally extending shoulder or ridge formed along the inner side of the bar 118.

Referring to FIG. 10, it will be seen that the template or pattern 125 shown therein has formed thereon an irregular surface representing the contour of the surface to be machined on the work piece and cooperating with the stylus or feeler 100.

The spring 102 bearing against the feeler arm 98 functions to move the feeler or stylus 100 toward the template or pattern and in engagement therewith. At the end of each roughing or finishing cut the feeler or follower 100 is in engagement with the template or pattern and the spring 102 maintains such feeler or follower in contact with the template or pattern. At this time the position of the feeler or follower arm 98 will be such that the valve body 73 will be in central position as shown in FIG. 9 while the longitudinal movement of the carriage 38 will have terminated and the cutting movement of the contour slide 46 will have ceased. The mechanism now to be described is for the purpose of moving the follower or stylus 100 out of engagement with the template or pattern 125 to an inactive position and to effect shifting of the valve body 73 to a position such that the contour slide 46 will move rearwardly to move the contouring cutting tool carried thereby to an inactive position.

The valve and follower slide 57 mounts a bracket 128 secured to or formed integral with the slide and having a boss-like portion 129 provided with a bore slidably mounting a push and pull rod 130. The boss-like portion 129 of the bracket 128 is cut away centrally so that a lever arm 131 can have its end located in the cut away portion and connected to the rod 130 by a pin connection. The opposite end of the lever arm 131 is provided with a split clamping portion in which one end of a shaft 132 can be clamped, the other end of the shaft 132 being rectangular in cross section and located closely adjacent to the lower end 97 of the feeler arm 98 (see FIGS. 6 and 7), it being understood that the shaft 132 will be sufficiently spaced from the lower end 97 of the feeler arm to permit the necessary rocking movements of said arm under working conditions.

When the push and pull rod 130 is in its outmost position as shown in FIG. 5, the square end of the shaft 132 will be so positioned that its side toward the feeler arm 98 will extend substantially parallel thereto. When the push and pull rod 130 is pushed inwardly from the position shown in FIG. 5 then the lever 131 and shaft 132 are rocked and this causes an edge of the square portion of the shaft 132 to engage the lower end 97 of the feeler arm and rock said arm against the action of the spring 102 thus moving the stylus or feeler 100 out of contact with the pattern or template and also moving the valve body 73 toward the left as viewed in FIG. 9 and to a position wherein the bore in the cylinder 47 at the large area side of the piston head 53 will be connected to drain, whereupon the slide moves rearwardly in quick motion until the inner end of the bore in the cylinder 47 abuts the boss 54 on the piston head as shown in FIG. 9.

The push and pull rod 130 is provided with longitudinally spaced recesses in which a spring pressed ball detent 133 will engage to hold the rod 130 either in its outwardly pulled position or in its inwardly pushed position.

It will be recalled that the valve and follower slide 57 is mounted on the cylinder 47 of the contour slide 46. In order to provide for changing the relationship between the position of the follower arm and its feeler or stylus carried by the slide 57 and the position of the contour cutting tools carried by the slide 46 for different diameters of work the following arrangement is provided.

A screw 134 has a threaded connection to the slide 57 and is fixedly connected to a rotatable and endwise movable cylindrical control member 135 rotatably and endwise movably supported in the bore of a supporting boss 136 formed on a bracket 137 forming part of the supporting plate 55. The cylindrical member 135 outwardly of the boss 136 is provided with an actuating knob 138. The cylindrical member 135 intermediate the knob 138 and the boss 136 is provided with an annular shoulder 139 which is normally held against the boss 136 by the action of a coil spring 140 located on the opposite side of the boss 136 and surrounding the member 135 with one end of the spring abutting the boss and the other end an annular shoulder formed on the member 135. The screw 134 consequently is held normally against axial movement relative to the boss 136 so that rotation of the screw 134 by the knob 138 causes the valve and follower slide 57 to be shifted on the dovetail guideway 56 to thus vary the relationship of the stylus or feeler 100 with respect to the position of the contour cutting tool carried by the slide 46.

In order to vary the relationship between the stylus or feeler 100 and the position of the contour cutting tool carried by the slide 46 to effect one or more successive roughing cuts of a predetermined depth in the work piece before taking the final finishing cut the following arrangement is provided.

The boss 136 on its upper side pivotally mounts a plurality of stop levers 141, 141a and 141b which, in this instance, are shown as three in number. The stop levers are each provided on its underside with a stop or heel projection 142. The projections 142 are arranged successively at varying distances from the pivotal mounting of the levers on the boss 136.

The stop levers 141, 141a and 141b can fall to their lower position by gravity and when the shoulder 139 is in engagement with the boss 136 the stop levers will be held in an inactive position by the shoulder 139 upon which they rest. It will be understood, of course, that the stop levers 141, 141a and 141b can be manually swung upwardly and backwardly to an inactive position when desired and out of engagement with the shoulder 139.

The lever 141 having the projection 142 that is farthest away from the pivot of the levers constitutes the stop lever functioning for the first roughing cut while the other two stop levers 141a and 141b successively having the projections 142 nearer to the pivotal axis of the levers function for the second and third roughing cuts.

In setting up the machine for taking the roughing cuts the knob 138 is pulled outwardly away from the boss 136 against the spring pressure 135, whereupon the projections 142 of all the stop levers fall in between the shoulder 139 and the boss 136 by gravity and thereafter release of the knob 138 will allow the spring 135 to shift the shaft 134 and knob 138 axially until the inner side of the shoulder 139 engages the projection 142 of the lever 141 that controls the first roughing cut.

It will be understood that this has effected a shift in the relative position of the valve and follower slide 57 with respect to the slide 46 and has thus changed the relationship between the stylus 100 and the cutting tool carried by the slide 46 such that the stylus 100 engages the template before the cutting tool has entered the work the full depth of the finishing cut or of the second and third roughing cuts.

When the first roughing cut has been completed and the carriage 38 has stopped its longitudinal movement and the slide 46 has been moved rearwardly in rapid return by the operator pushing in the push and pull rod 130 then the operator moves the carriage to the starting position for the second roughing cut, lifts the latch lever 141 controlling the first roughing cut to an inactive position and allows the levers 141a and 141b for the second and third roughing cuts to remain in active position, whereupon the shoulder 139 under the action of spring 135 instantly engages the projection 142 of the lever 141a. Then the operator pulls out the push and pull rod 130 to engage the stylus with the template or pattern and to cause the slide 46 to advance until the cutting tool is in a position for the second roughing cut. The longitudinal feed movement of the carriage 38 is started and the cutting tool performs the second roughing cut controlled by the engagement of the pattern by the stylus.

At the end of the second roughing cut when the longitudinal movement of the carriage has ceased the operator pushes in the rod 130 to disengage the stylus from the template and to move the slide 46 rearwardly in fast motion and then causes the carriage to move rearwardly to its starting position. After this has been done the operator raises the lever 141a for the second roughing cut to an inactive position with the lever 141b for the third roughing cut remaining in active position with its projection 142 immediately engaged by the shoulder 139 under the action of the spring 135.

The relationship between the stylus and the cutting tool is now adjusted for the third roughing cut. The operator then pulls out the rod 130 to cause the stylus or feeler to move toward the pattern under the action of the spring 102 and then initiates the longitudinal working movement of the carriage and the third roughing cut is taken in the work piece under the control of the engagement of the stylus with the pattern.

When the third roughing cut has been completed the carriage will have stopped its longitudinal movement. The operator then pushes in the rod 130 to disengage the stylus from the pattern and to cause the contour slide 46 to move rearwardly in rapid motion. He then causes the carriage to move rearwardly to its starting position and lifts the stop lever 141b for the third roughing cut to an inactive position, whereupon the shoulder 139 immediately engages the boss 136 under the action of the spring 140. Thereafter the operator pulls out the rod 130 to allow the stylus or feeler to rock under the action of the spring 102 and to bring the contouring cutting tool into position for the finishing cut with the feeler contacting the template. He then commences the longitudinal movement of the carriage and the cutting tool thereupon making the finishing cut in the work piece under the control of the engagement between the pattern and the stylus. It will be understood that the longitudinal working movement of the carriage ceases at the end of the finishing cut.

The contour slide 46 is, as previously stated, provided with an indexible tool holder 48 which mounts a finishing contour cutting tool 143 and a roughing contour cutting tool 144. The mounting of the indexible tool holder 48 and the mechanism for indexing and clamping the same by power will now be described.

The slide 46 mounts for limited endwise movement a vertically extending shaft 145. The lower end of the shaft 145, as viewed in FIG. 9, has secured to it a piston head 146 slidable in a cylindrical counterbore 147 and above the counterbore 147 the shaft 145 is splined to the slide 46 so that it does not rotate relative to the slide but has limited endwise movement relative thereto. The shaft 145 passes through a collar 148 rigidly connected to the upper side of the slide 146 and into a counterbore 149 formed in the tool holder 48 from whence it extends into a chamber 150 formed in the tool holder.

The chamber 150 in the tool holder forms the cylinder of a pressure fluid motor and is provided at diametrically located points with vanes 151, the inner ends of which are arcuate and engage the circumference of a stator ring 152 secured to the shaft 145. The stator ring 152 at diametrically located positions is provided with radially extending stationary vanes 153, the outer ends of which are arcuate and interfit the wall of the chamber 150, see FIG. 14.

The chamber 150 is closed by a closure plate 154 secured to the upper side of the tool holder 48 and provided with a central bore through which the shaft 145 extends. The shaft 145 above the closure plate 154 has fixed to it a collar 155 which supports a valve sleeve 156 rotatably fitting the shaft 145 and contained within a housing 157 which is rotatable with the sleeve as a unit.

A connecting plate 158 is fixedly secured to the upper end of the shaft 145 above the valve housing 157 and is provided with an inlet passage 159 to which the inlet conduit 160 of the pressure fluid circuit is connected and with an outlet or drain passage 161 to which the outlet or drain conduit 162 of the circuit is connected. It will be understood that the connecting plate 158 is fixed while the valve housing 157 and valve sleeve 156 rotate as a unit on the shaft 145 and relative to said plate between the latter and the collar 155.

The underside of the tool holder 48 and the upper side of the contour slide 46 have cooperating serrations which are engaged or disengaged by slight endwise movement of the tool holder and shaft 145 to lock the tool holder in indexed position or to unlock the same for indexing rotation.

Opposed rat trap springs 163 are carried by the shaft 145 and the plate 158 and act on abutting portions 163a of the housing 157 to normally maintain said housing in a central or intermediate position. The valve housing 157 fixedly supports a valve operating lever 164 which can be moved from its normally central or intermediate position to one side or the other of such position to effect unlocking, indexing and locking of the tool holder to bring either the roughing cutting tool 144 or the finishing cutting tool 143 into operative position.

Before describing the details of the control valve for the indexible tool holder 48 it should be pointed out that the inlet conduit 160 connected to the connecting plate 158 extends to and is connected to the conduit 71 of the pressure fluid circuit previously described and thus is connected to the output side of the pump 69. It should also be observed that the exhaust or drain conduit 162 connected to the connecting plate 158 extends to and is connected with the previously described conduit 67 that extends to the sump 68.

As already stated, the inlet conduit 160 is connected to the inlet passage 159 in the connecting plate 158 while the outlet or drain conduit 162 is connected to the outlet passage 161 in said plate. The inlet passage 159 registers and communicates with a passage 165 formed in the upper end of the shaft 145 and extending downwardly a distance longitudinally thereof and having a laterally extended inner end constituting a port 166 communicating with an annular groove 167 in the inner circumference of the sleeve 156 (see FIGS. 9, 15 and 16).

The annular groove 167 communicates with a vertically extending passage 168 formed in the valve sleeve 156 and valve housing 157. The vertically extending passage 168 communicates with vertically spaced ports 169, 170 and 171 formed at different planes in the valve sleeve 156 and extending to the inner circumference thereof, see FIGS. 9, 16, 18, 19 and 20.

The outlet or drain passage 161 in the connecting plate 158 registers and communicates with an outlet or drain passage 172 formed in the upper end of the shaft 145 and extending longitudinally and vertically downwardly of the shaft and having at its lower end a laterally offset port 173 communicating with an annular groove 174 formed in the inner circumference of the valve sleeve 156, see FIGS. 9 and 15.

The annular groove 174 communicates with three circularly spaced vertically extending passages 175 formed in the valve housing 157 and valve sleeve 156 and spaced substantially 90° apart. One of the passages 175 is shown in FIG. 9 while all three of the passages 175 are shown in FIGS. 15, 16, 17, 18, 19 and 20. The lower ends of the three passages 175 communicate with an annular groove 176 formed in the circumference of the valve sleeve 156, see FIGS. 9 and 17. The purpose of the annular grooves 174 and 176 is that should any of the pressure fluid in the valve between said grooves leak or seep along the shaft 145 it will be collected in said annular grooves and carried to drain.

Referring to FIG. 18, it will be seen that in this plane the two vertical passages 175 which are diametrically opposed communicate with ports 177 and 178 formed in the valve sleeve 156 and extend to the inner circumference thereof. It will also be seen that these two diametrically opposed vertically extending passages 175 communicate in the plane of FIG. 18 with arcuate passages 179 and 180 formed intermediate the valve sleeve 156 and the valve housing 157. The arcuate passage 179 communicates with a radial port 181 and the arcuate passage 180 communicates with a radial port 182, both of which ports are formed in the valve sleeve 156 and extend to the inner circumference thereof.

Referring to FIG. 19, it will be seen that in this plane through the valve the two diametrically opposed longitudinal passages 175 communicate, respectively, with arcuate passages 183 and 184 and that said arcuate passages at their ends communicate, respectively, with radial ports 185 and 186 formed in the valve sleeve 156 and extending to the inner circumference of the same.

Still referring to FIG. 19, it will further be seen that in this plane through the control valve the valve sleeve 156 is provided with radial ports 187 and 188 communicating, respectively, with the diametrically opposed longitudinal passages 175 and extending to the inner circumference of the valve sleeve.

Referring to FIG. 20, it will be seen that the two diametrically opposed longitudinal passages 175 communicate, respectively, with arcuate passages 189 and 190 formed in the valve sleeve 156 and valve housing 157 with the longitudinal passages 175 located midway between the ends of the arcuate passages 189 and 190.

The opposite ends of the arcuate passage 189 communicate, respectively, with radial ports 191 and 192 while the opposite ends of the arcuate passage 190 communicate, respectively, with radial ports 193 and 194, said radial ports 191, 192, 193 and 194 being formed in the valve sleeve 156 and extending to the inner circumference of the latter.

Referring to FIG. 17, it will be seen that the shaft 145 in this plane is provided with longitudinally extending passages 195, 196 and 197 (also see FIG. 9). The passage 195 extends downwardly in the shaft 145 into approximately the plane of the stator 152 where it communicates with a pair of divergent outwardly extending passages 198 and 199 communicating with the motor chamber in two of the four spaces between the stationary vanes 153 of the stator and the movable vanes 151 of the rotor which it will be recalled is the indexible tool holder 48, see FIG. 14.

The passage 196 extends downwardly below the plane on which FIG. 17 is taken and centrally of the shaft 145 and communicates with the counterbore 147 between the piston 146 and the inner end or bottom of the counterbore. The passage 197 extends downwardly of the shaft 145 below the plane of FIG. 17 to approximately the location of the stator 152 where it communicates with a pair of divergent passages 200 and 201 communicating with the chamber of the pressure fluid motor and with the remaining two of the spaces between the stationary vanes 153 and the movable vanes 151.

The passage 195 extends longitudinally and vertically upwardly in the shaft 145 above the plane of FIG. 17 and reference to FIG. 18 will show that the upper end of said passage 195 communicates with a diametrically extending passage 202 formed in the shaft 145 and extending to the circumference thereof and in the central position of the valve indicated in FIG. 18 communicating with the ports 181 and 182 previously referred to.

The passage 196 in the shaft 145 extends upwardly above the plane of FIG. 17 and its upper end in the plane of FIG. 20 communicates with the diametrically extending passage 203 formed in the shaft 145 and extending to the circumference thereof and in the central position of the valve indicated in FIG. 20 and one end of the passage 203 connects with the port 171 while the opposite end of the passage 203 is closed by the wall of the sleeve 156.

The passage 197 above the plane of FIG. 17 extends upwardly of the shaft 145 to the plane of FIG. 19 where it communicates with a diametrically extending passage 204 formed in the shaft 145 and having its opposite ends in the central position of the valve shown in FIG. 19 connected, respectively, to the ports 185 and 186 in the valve sleeve.

The control valve for the indexing of the tool holder 48 has a central or intermediate position as indicated in FIGS. 15, 16, 17, 18, 19 and 20 and a left hand indexing position and a right hand indexing position shown in FIGS. 18a, 19a, 20a and 18b, 19b, 20b, respectively.

Referring to FIGS. 18 and 18a, it will be seen that when the valve housing 157 and valve sleeve 156 are rotated as a unit in a counterclockwise direction from the central position of FIG. 18 to the left hand operative or indexing position of FIG. 18a that then the port 178 registers with the passage 202 in the shaft 145. Also at this time the port 177 in the valve sleeve registers with the passage 202 in the shaft. Hence the longitudinal passage 195 in the shaft 145 is at this time connected to drain. The ports 181 and 182 that communicate with the arcuate grooves 179 and 180 are closed by the circumference of the shaft 145.

The counterclockwise movement of the valve housing and sleeve from central position to the left hand indexing position has also caused the port 170 to move from the position shown in FIG. 19 to the position shown in FIG. 19a wherein it communicates with one end of the diametral passage 204 in the shaft 145 while the opposite end of said passage is closed by the valve sleeve 156. Since port 170 communicates with the longitudinal passage 168 that is connected to the pressure side of the pressure fluid system fluid pressure is now connected to the longitudinal passage 197 in the shaft 145 and flows to the pressure fluid motor to impart counterclockwise indexing rotation to the tool holder 48 until the movable vanes 151 abut the stationary vanes 153, it being recalled that passage 195 at this time is connected to drain (see FIG. 18a).

Now referring to FIG. 20, it will be seen that the port 171 in the valve sleeve 156 registers with the diametral passage 203 in the shaft 145 and this connects the pressure passage 168 to the passage 196 and hence the pressure fluid in the central position is acting on the piston head 146 to move the shaft 145 and the tool holder 48 downwardly to interengage serrations 148a formed on the underside of the tool holder and the upper side of the slide 46 to lock the tool holder in the position to which it has previously been indexed and the pressure remains on the piston head until the valve housing has been rocked from its central position.

If the operator moves the control lever 164 toward the right to impart counterclockwise or left hand rotation to the valve housing 157 and valve sleeve 156 to move the parts of the control valve in the plane of FIG. 20 from the position shown in FIG. 20 to the position shown in FIG. 20a, then the port 171 moves out of communication with the passage 203 and is closed by the circumference of the shaft 145 disconnecting the passage 196 from the pressure side of the circuit. This counterclockwise movement of the valve housing and valve sleeve connects the ports 191 and 194 with the diametral passage 200 in the shaft 145 and hence connects the passage 196 to drain, thus removing the pressure from the piston head 146, whereupon the spring 149a in the counterbore 149 in the tool holder 48 functions to raise said tool holder and shaft 145 to disengage the cooperating serrations 148a to unlock or release the tool holder 48 for indexing movement which immediately occurs due to the connection of the passage 197 to the pressure side of the circuit and the passage 195 to the exhaust side as explained in connection with FIGS. 19a and 18a.

As soon as the tool holder has been indexed in the counterclockwise direction to position one of the cutting tools carried thereby in operative position the operator releases the control handle 164 and the rat trap springs 163 act on the valve housing and valve sleeve to rotate the same in a clockwise direction from the position shown in FIGS. 18a, 19a and 20a into the position shown in FIGS. 18, 19 and 20, i.e., central position of the valve housing and valve sleeve.

This clockwise rotation of the valve housing and valve sleeve does not effect any rotative movement of the tool holder 48 and as soon as the valve housing and valve sleeve are in the central position then the passage 196 is connected to the pressure side of the circuit as shown in FIG. 20 so that pressure fluid acts on the piston head 146 to move the tool holder 48 and shaft 145 against the action of the spring 149a to interengage the serrations 148a and lock the tool holder in its indexed position.

It will now be assumed that the tool holder 48 is to be indexed from its counterclockwise or left hand indexed position just described to its clockwise or right hand indexed position, the operator moves the control lever 164 from its central position to its left hand position to impart clockwise rotation to the valve housing 157 and sleeve 156. This clockwise rotation causes the ports and passages in the plane of FIG. 18 to change the relationship shown in FIG. 18 to that shown in FIG. 18b. This clockwise rotation of the valve housing and sleeve moves the drain port 182 out of communication with the diametral passage 202 in the shaft 145 and said port 182 is closed by the circumference of the shaft. Also this movement causes the pressure port 169 to move into communication with the passage 202 and thus connects said passage and the longitudinal passage 195 to the pressure side of the circuit. At this time the drain ports 177, 178, 181 and 182 have also moved out of communication with the passage 202 and are closed by the circumference of the shaft 145. Since the longitudinal passage 195 extends to the motor pressure fluid now flows to said motor between the stationary vanes 153 and the movable vanes 151 to rotate the tool holder 48 carrying the movable vanes in a clockwise direction until the movable vanes contact the stationary vanes. The pressure fluid in the passage 195 is able to impart this clockwise rotation to the tool holder 48 since the clockwise or right hand rotation given the valve housing 157 and valve sleeve 156 has changed the relationship of the ports and passages in the plane of FIG. 19 from the position shown in said figure to the position shown in FIG. 19b.

At the start of the clockwise movement referred to the passage 197 was momentarily disconnected from drain but was again connected to drain at the completion of such movement to allow the indexing movement to commence.

Referring to FIG. 19b, it will be seen that the drain port 188 now communicates with the diametral passage 204 with which the longitudinal passage 197 is in communication. The drain port 186 and the pressure port 170 are now closed by the circumference of the shaft 145. Also the drain port 187 now communicates with the passage 204 while the drain port 185 is closed by the circumference of the shaft.

Referring to FIGS. 20 and 20b the clockwise rotation of the valve housing and valve sleeve first moves the pressure port 171 out of communication with the diametral passage 203 and hence the longitudinal passage 196 is disconnected from the pressure side of the circuit. The clockwise rotation of the valve housing and sleeve registers the drain ports 193 and 192 with the opposite ends of the diametral passage 203 so that the longitudinal passage 196 is connected to drain, whereupon the spring 149a acts upwardly on the tool holder 48 to disengage the serrations 148a to allow the motor to impart the clockwise indexing rotation to the tool holder.

When the indexing rotation has been completed the operator releases the control lever 164 and the rat trap springs 163 act on the valve housing to rotate the latter and the valve sleeve in a counterclockwise direction to reestablish the relationship of the ports and passages from those shown in FIGS. 18b, 19b and 20b to those shown in FIGS. 18, 19 and 20, at which time pressure fluid is on the passage 196 and the piston head 146 and moves said piston head downwardly to interengage the serrations 148a and lock the tool holder in its presently indexed position.

In order to coordinate the description hereinbefore set forth and to clearly bring out the functional characteristics and advantages of the mechanism embodying the invention a brief description will now be given of an operative cycle of the mechanism.

It may be assumed that a template or pattern 125 as shown in FIG. 10 having the contouring surface desired to be produced on the work piece is mounted in the brackets 106 and 109 on the pilot bar 32 and is properly adjusted therein by means of the adjusting screws 114 and 120. It will also be assumed that the work piece is properly chucked in the work spindle 27 and that a suitable finishing cutting tool 143 and a suitable roughing cutting tool 144 are clamped in the tool holder 48 in their proper predetermined positions. It may further be assumed that with the carriage 38 in its starting position the knob 138 has been turned to the proper position to adjust the relationship between the stylus or feeler 100 and the template for the finishing cut that is to be taken in the particular work piece of a given diameter. It may further be assumed that the knob 138 has been pulled outwardly to compress the spring 135 and that the three stop levers 141, 141a and 141b have been moved downwardly to active position so as to provide for the successive roughing cuts. Also it may be assumed that the operator has indexed the tool holder 48 to position the roughing tool 144 in cutting position and has pulled the rod 130 outwardly so that the stylus or feeler 100 engages the template or pattern and the contouring control valve 73 is in its central position as shown in FIG. 9 when the contour slide 46 has moved forwardly until the stylus is rocked to vertical position by the template. The operator now starts the longitudinal forward movement of the carriage 38 to cause the roughing cutting tool to engage the work and commence the first roughing cut. If the template causes the feeler or follower to rock in a direction to shift the valve 73 toward the right as viewed in FIG. 9, then the pressure side of the circuit is connected to the bore of the cylinder 47 on the large area side of the piston head 53 and acts to move the contour slide 46 forwardly to cause the cutting tool to take a cut in the work piece conforming to the template.

If the configuration of the template changes so that the feeler or follower is rocked in the opposite direction to move the control valve 73 toward the left as viewed in FIG. 9, then the bore in the cylinder 47 on the large area side of the piston head 53 is connected to drain, whereupon the contour slide 46 is moved rearwardly under the pressure on the small area side of the piston head 53. Consequently the movements of the feeler or follower in its engagement with the template or piston during the longitudinal feed movement of the carriage causes the contour slide 46 to move forwardly or rearwardly with a movement relative to the movement of the carriage and in accordance with the configuration of the template or pattern to reproduce in the work piece the same contour. It will also be recalled that the slide 46 is disposed at an angle of 45° to the direction of the longitudinal movement of the carriage and hence the cutting tool can take both longitudinal cuts and facing cuts in the work piece.

At the end of the first roughing cut the longitudinal feed movement of the carriage is terminated and the operator pushes the rod 130 inwardly to rock the feeler or stylus out of engagement with the template and to shift the valve 73 toward the left as viewed in FIG. 9 to connect the large area side of the piston head 53 to drain and to cause the contour slide 46 to move rapidly rearwardly to its most rearward position as indicated in FIG. 9. The carriage 38 is now moved rearwardly to its starting position and then the operator lifts the stop lever 141 for the first roughing cut to an inactive position, after which the operator pulls the rod 130 to its outermost position whereupon the feeler arm rocks under the action of the spring 101 to shift the valve 73 toward the right to connect the bore in the cylinder 47 on the large area side of the piston head 53 to the pressure side of the circuit to cause the contour slide 46 to move forwardly until the feeler has engaged the template and been moved to its vertical or central position thereby, whereupon the valve 73 is in its central position and the motion of the slide 46 terminates. The mechanism is now in condition to commence the second roughing cut and the operator initiates this second roughing cut by starting the longitudinal feed movement of the carriage 38.

The feeler 100 follows the template during the second roughing cut and the movement of the feeler controls the in and out movement of the contour slide 46 as already explained with respect to the first roughing cut. At the end of the second roughing cut the longitudinal feed movement of the carriage 38 stops and the operator pushes the rod 130 inwardly to disengage the feeler from the template and to effect rapid rearward movement of the contour slide 46 to its inactive position. The operator now causes the carriage 38 to move rearwardly to its starting position and lifts the stop lever 141a for the second roughing cut to an inactive position leaving the lever 141b for the third roughing cut in its active position. He then pulls the rod 130 outwardly to allow the feeler arm 98 to be rocked by the spring 102 and to shift the valve 73 to cause forward movement of the slide 46 until the feeler contacts the template and is moved into vertical position to shift the valve 73 to its central position. The operator then initiates the feeding movement of the carriage 38 and the roughing cut tool performs the third roughing cut in the work piece under the control of the template and feeler as already explained.

At the end of the third roughing cut the operator pushes the rod 130 inwardly to cause the contour slide 46 to move rapidly rearwardly to its rearward position and to rock the feeler out of engagement with the template. The operator now causes the carriage to move rearwardly to its starting position and then he lifts the stop lever 141b for the third roughing cut out of active position to inactive position whereupon the shoulder 139 contacts the face of the boss 136 under the action of the spring 135. The operator then moves the control lever 164 to rotate the indexing control valve to effect unlocking of the tool holder 48, indexing of the same to bring the finishing cutting tool 143 into active position and then he releases the control lever 164 which returns to central position under the action of the rat trap springs, whereupon the tool holder 48 is automatically locked in indexed position. The operator pulls the rod 130 outwardly and the contour slide 46 moves forwardly until the feeler engages the template and is moved by the template to a vertical position wherein the further movement of the contour slide ceases. Now the operator initiates the longitudinal feeding movement of the carriage 38 and the finishing cutting tool 143 takes the finishing cut in the work piece under the control of the template and feeler. At the end of the finishing cut the feeding movement of the carriage stops and the operator pushes in the rod 130 to cause the contour slide 46 to move rapidly rearwardly to its inactive position.

If the work piece requires additional machining operations these can be performed now by tools on the square turret 42 or if the work piece is bar stock a cutoff tool on the square turret 42 can sever the finished work piece from the bar stock and the latter fed forwardly the desired length for a new work piece. Of course if the work piece is not bar stock then it is removed from the chuck of the spindle and a new work piece inserted in the chuck.

The operator now causes the carriage to move rearwardly to starting position and then he pulls the knob 138 outwardly and positons the three stop levers 141, 141a and 141b in their active positon, after which he indexes the tool holder 48 to position the roughing cutting tool 144 in its active postion, it being recalled that he does this by the lever 164. When this has been done the operator pulls the rod 130 outwardly to cause the contour slide 46 to move forwardly until the feeler 100 engages the template and the feeler arm is rocked to vertical postion whereupon the forward movement of the contour slide 46 terminates. The operator initiates a new work cycle by starting the longitudinal feed movement of the carriage.

It will be understood that during the contour machining cycle of operations under the control of the template the other machining operations may be performed on the work piece by tools mounted in tool holders on the indexible hexagonal turret 31 and engaging and steadied by the pilot bar 32 and which machining operations may be performed if the nature of the finished work piece so requires, and particularly if the contouring machining cuts are time consuming.

Also machining operations may be performed on the work piece by tools mounted on the square turret 42, either previously or subsequently to the contouring machining to produce a complete work piece for one setting of the machine and within a minimum time period.

The machining operations which may be performed by cutting tools on the various faces of the hexagonal turret 31 during the contouring machining operations include the following: drilling, boring, facing, threading, chamfering and possibly others. The machining operations which can be performed by cutting tools on the square turret 42 either prior to the contouring machining or after the same has been completed include facing, turning, chamfering, cutoff and possibly others.

In other words, the contouring apparatus embodying the present invention when used on a machine tool such as a conventional turret lathe enables all the usual machining operations to be performed on the work piece simultaneously or sequentially by cutting tools on the square turret or on the hexagonal turret, in addition to the contouring machining operations performed by the cutting tools on the tool holder 48 of the apparatus. This enables complete machining of a work piece with all the necessary machining operations being performed thereon including a contouring operation for one chucking of the work piece in the machine.

In view of the statements just above made that machining operations may be performed on the workpiece by tools mounted in tool holders on the indexible hexagonal turret 31 and engaging and steadied by the pilot bar 32 and which machining operations may be performed simultaneously during contouring machining operations, a template 125a is shown in FIG. 1 having a different contour from the template 125 shown in FIG. 10 to provide for the machining of a workpiece such as is shown in FIG. 1B. FIG. 1 shows the workpiece of FIG. 1B mounted in the turret lathe. Also FIG. 1 shows the outermost template support 109 on the pilot bar 32 as being located a substantial distance inwardly of the free end of the pilot bar, wherefore the tool holder H mounted on the active face of the indexible turret 31 can have telescopic sliding relationship with the pilot bar 32 over a substantial distance of the latter adjacent the free end thereof without interfering with or contacting the outermost template support 109.

The workpiece A shown in FIGS. 1 and 1B consists of a cylindrical portion Wa of relatively large diameter and a cylindrical portion Wb of smaller diameter and extending centrally from one side face of the portion Wa and having at its outer or free end a flared or bell-shaped portion Wc.

In operating the machine to machine the workpiece W tools on the front tool holder of the cross slide will machine or turn the circumference of the portion Wa and the face thereof from which the portion Wb extends. In machining the circumference of the portion Wa the cross slide 40 is moved transversely of the bed of the machine to engage the cutting tool of the front tool holder with said circumference and then the cross slide carriage 36 is fed longitudinally of the bed to move the cutting tool axially of said circumference until the face of the portion Wa of the workpiece W from which the portion Wb extends is reached. Then the cross slide 40 is fed transversely of the bed so that a facing tool carried by the front tool holder of the cross slide will face machine said face of the portion Wa of the workpiece until the portion Wb thereof is reached. Then the cross slide carriage is fed longitudinally of the bed toward the headstock while the tool carried by the front tool holder of the cross slide machines or turns the circumference of the portion Wb of the workpiece. This longitudinal feed of the cross slide carriage continues until the start of the flared or bell-shaped portion Wc of the workpiece is reached, whereupon the cross slide 40 is moved transversely of the bed to back off the cutting tool carried by the front tool holder and to bring the follower 100 of the contour slide which has been properly positioned due to the longitudinal feed of the carriage into engagement with the curved portion of the template 125a at the starting point thereof. The continued longitudinal feed of the cross slide carriage 36 toward the headstock 26 imparts longitudinal feed to the cutting tool carried by the tool holder of the contour slide and said tool also has transverse feed under the control of the template 125a and follower 100 to machine the curved periphery of the portion Wc of the workpiece. The longitudinal movement of the carriage also provides the movement of the follower longitudinally of the template 125a. Simultaneously with the machining of the curved periphery of the portion Wc of the workpiece the turret slide 31 is fed longitudinally of the bed toward the headstock to cause the boring tool B carried by the tool holder H secured to the actively indexed face of the indexible turret 31 to centrally bore the portions Wa and Wb of the workpiece W to form the central longitudinally extending bore B' therein and shown in FIG. 1B. During this boring operation and the said longitudinal feeding movement of the turret slide 30, the tool holder H has telescopic sliding engagement with the free end of the pilot bar outwardly of the outer template holder 109 so that the pilot bar 32 steadies the tool holder H during the boring operation which is taking place simultaneously with the contouring machining of the periphery of the flared or bell-shaped portion Wc of the workpiece.

Although a preferred embodiment of the invention has been illustrated and described herein it will be understood that the invention is susceptible of various modifications and adaptations as fall within the scope of the appended claims.

Having thus described my invention, I claim:

1. In a machine tool having a headstock mounting a work spindle, a bed provided with longitudinal ways, a carriage movable on said ways toward and from the headstock, a stationary pilot bar carried by said headstock above said spindle and extending longitudinally of said bed parallel to said spindle and having a free end remote from said headstock, a turret slide supported on said ways and beyond the carriage from the headstock for movement toward and away from said carriage, an indexible turret on said turret slide and mounting on a face thereof a tool holder having a portion slidably telescoping the free end of the pilot bar, a contour slide carried by said carriage for movement relative thereto in a direction transverse to the axis of said spindle and the path of movement of said carriage, a follower movably mounted on said contour slide, power means for moving said contour slide relative to said carriage, means carried by said contour slide and actuated by the movement of the follower for controlling said power means, and a template mounted on said pilot bar inwardly of the free end of the latter and cooperating with said follower to control said power means during movement of said carriage on said ways and movement of said contour slide relative to said carriage transversely of the spindle axis.

2. In a machine tool as defined in claim 1 and wherein means is provided for adjusting the position of said template on and relative to said pilot bar and for clamping said template in adjusted position.

3. In a machine tool having a headstock mounting a work spindle, a bed provided with front and rear ways extending parallel to the axis of said spindle, a carriage movable on said ways toward and from the headstock, a cross slide movable on said carriage transversely of said ways and extending from forwardly of the front way beyond the rear way, a stationary pilot bar carried by said headstock above said spindle and extending longitudinally of the bed parallel to the axis of the spindle and having its free end normally located beyond said carriage on the side thereof opposite said headstock, a turret slide disposed on said ways on the side of said carriage opposite from said headstock, an indexible turret on said turret slide and mounting on a face thereof a tool holder having a portion slidably telescoping the free end of said pilot bar, a contour slide carried by said cross slide for movement relative to said cross slide and said carriage in a direction transverse to the axis of said spindle and the paths of movement of said carriage and cross slide and located entirely beyond the rear way and rearwardly of the axis of the spindle, a follower movably mounted on said contour slide, a template mounted on said pilot bar inwardly of the free outer end thereof and the inner limit of telescoping movement thereon of the tool holder on said indexible turret and cooperating with said follower to move the latter during movement of said carriage on said ways, and power means controlled by the template induced movements of said follower for moving said contour slide relative to said carriage and said cross slide.

4. In a machine tool having a work spindle, a bed provided with front and rear ways extending parallel to the axis of said spindle, a carriage movable on said ways in either direction along the extended axis of said spindle, a cross slide on said carriage and movable transversely to the movement of said carriage and extending over the front and rear ways and provided wtih a tool holder adjacent one of said ways and on one side of said spindle axis, a contour slide carried by said cross slide entirely adjacent the other way for movement relative to the movement of said carriage and cross slide and in a direction transverse to the axis of said spindle and provided with a tool holder on the other side of the spindle axis from said tool holder on the cross slide, a pattern follower movably mounted on said contour slide, a template stationarily supported by the machine tool and cooperating with said follower to move the latter during movement of said carriage, and power means controlled by said follower for moving said contour slide relative to said cross slide, the movement of said carriage on said ways providing longitudinal feeding movement for a tool carried by the tool holder on said cross slide and also providing longitudinal feeding movement of said pattern follower relative to said cooperating template and longitudinal feeding movement of a tool carried by the tool holder on said contour slide, the movement of the cross slide to back off from the workpiece a tool carried by the tool holder on the cross slide acting to engage the follower with said template.

5. In a machine tool as defined in claim 4 and wherein said follower is movably mounted on a follower slide carried by said contour slide and adjustably movable relative thereto in a direction transverse to the path of movement of said contour slide, while means is provided for adjusting the position of said follower slide relative to said contour slide to change the relative position of the follower with respect to the contour slide for different diameters of workpieces.

6. In a machine tool as defined in claim 4 and wherein said follower is movably mounted on a follower slide carried by said contour slide and adjustably movable relative thereto in a direction transverse to the path of movement of said contour slide, while slidable means is provided for successively varying the adjusted relationship between the follower slide and the contour slide during each work cycle to change the relationship between the follower and the template to provide for successive roughing and finishing cuts upon a workpiece by tools mounted upon the tool holder carried by the contour slide.

7. In a machine tool having a bed provided with ways and a headstock mounting a work spindle that is parallel to said ways, a cross slide mounting a tool holder on one side of the axis of said spindle and a contouring slide on the other side of said axis and provided with a tool holder, said contour slide having movement relative to said cross slide and transversely of said axis, a template carried by the machine tool and extending longitudinally of said bed, means carried by said contour slide for controlling the movement of said contuor slide on said cross slide and transversely of the axis of the spindle and including a movable follower cooperating with said template, and a carriage movable on said ways toward and away from said headstock and slidably supporting said cross slide for movement transversely of said ways, the movement of said carriage providing longitudinal feeding movements for tools carried by the tool holder on said cross slide and the tool holder on said contour slide and longitudinal positioning and feeding movements of said follower relative to said template, said movement of said cross slide on said carriage transversely of said bed providing transverse feeding movement for the tools carried by the tool holder on said cross slide and movement of said follower transversely of the bed into and out of operative engagement with said template.

8. In a machine tool having a contour slide mounted on a movable carriage, a follower slide carried by said contour slide and supporting a template follower adapted to cooperate with a template for initiating movement of the follower slide and contour slide, adjusting means carried by said contour slide and operatively connected to said follower slide and movable relative to said contour slide to adjust said follower slide on said contour slide including spring means on said adjusting means and normally acting to maintain said follower slide in its adjusted position, and stop means positionable between said contour slide and said adjusting means to vary the adjusted relationship between said follower slide and contour slide from the relationship normally maintained therebetween by said spring means to define a different adjusted position, said stop means being movable to an inactive position to permit the spring means to operate to move the follower slide to its normally adjusted position.

9. In a machine tool as defined in claim 8 and wherein the adjusting means includes a shaft rotatable and endwise movable in said contour slide and in threaded engagement with the follower slide and provided with an actuating knob for both rotating and endwise moving said shaft, said spring means acting on said shaft to normally endwise move the latter to engage said knob with said contour slide while said stop means carried by said contour slide can be interposed between said knob and said contour slide to vary the adjusted position of the follower slide.

10. In a machine tool as defined in claim 9 and wherein the stop means includes a plurality of pivoted levers, each provided with a stop lug, the lugs of said levers being spaced to successively hold said knob at varying distances from said contour slide when interposed between the knob and said contour slide and against endwise movement of said knob and shaft under the action of said spring means.

11. In a machine tool having a contour slide provided with an indexible tool holder thereon for mounting a roughing tool and a finishing tool, said contour slide being mounted on a movable carriage and carrying a follower slide and movable follower adapted to cooperate with a template for initiating movement of the follower slide and contour slide, means for indexing and locking the tool holder on said contour slide comprising a pressure fluid motor carried by said contour slide and operatively connected to said tool holder to index said tool holder in opposite directions to either of two positions, and a pressure fluid motor carried by said contour slide and operatively connected to said tool holder for locking the same after indexing by said first named motor, and a control mechanism for said motors, wherein the control mechanism for the pressure fluid motors has a normal central position in which the locking motor for the tool holder is actuated, said control mechanism being movable to one side or the other of said central position in either of which displaced positions said locking motor becomes inactive and said indexing motor becomes active and operates in one or the other direction to index the tool holder.

12. In a machine tool having a contouring slide, a follower slide carried on said contouring slide and adjustable relative thereto, said follower slide supporting a movable template follower, adjusting means for effecting adjustment of said follower slide relative to said contouring slide and including a movable member supported for endwise movement to effect the adjustment, a stop supported adjacent the adjusting means and engageable by a portion of the adjusting means to limit the endwise movement of said member in one direction short of its normal limit of movement in one direction, and means for selectively rendering said stop effective or ineffective.

13. In a machine tool having a headstock mounting a rotatable spindle and a bed provided with ways extending from said headstock and parallel to the axis of said spindle, a template carried by said machine tool, a carriage movable on said ways, a contour slide movably mounted on said carriage, a tool holder on said contour slide, a follower slide movable on said contour slide, a movable follower on said follower slide, means for initiating and controlling movements of the follower slide and contour slide, said follower cooperating with said template for controlling said means for initiating and controlling the movements of the follower slide and contour slide, means for adjusting the follower slide relative to the contour slide and to said template and comprising a shaft rotatably and endwise movably carried by the said contour slide, means carried by the follower slide having threaded engagement with said shaft for adjusting the follower slide relative to said tool holder when said shaft is rotated, a knob on said shaft for rotating and endwise moving the latter, spring means for endwise moving said shaft in one direction and maintaining said knob normally in contact with the contour slide, and selectively operable means for holding said knob out of contact with said contour slide when said shaft is moved endwise in the opposite direction by said knob and against the action of said spring means, whereby endwise movement of said shaft by said knob in the opposite direction, and the maintenance of said knob out of contact with said contour slide by said selectively operable means varies the adjusted position of the follower slide relative to the contour slide that was obtained by rotation of said shaft.

References Cited in the file of this patent

UNITED STATES PATENTS

| | | |
|---|---|---|
| 604,009 | Johnson | May 10, 1898 |
| 728,573 | Hanson | May 19, 1903 |
| 1,152,055 | Schellenback | Aug. 31, 1915 |
| 1,236,997 | Tolles | Aug. 14, 1917 |
| 1,514,352 | Taylor | Nov. 4, 1924 |
| 1,659,385 | Van Hamersveld | Feb. 14, 1928 |
| 1,768,495 | Schroder | June 24, 1930 |
| 2,347,367 | Rosen | Apr. 25, 1944 |
| 2,502,274 | Pearce | Mar. 28, 1950 |
| 2,505,685 | McClernon | Apr. 25, 1950 |
| 2,549,746 | Kylin | Apr. 17, 1951 |
| 2,592,920 | Lovely et al. | Apr. 15, 1952 |
| 2,603,117 | Turchan | July 15, 1952 |
| 2,608,896 | Greene | Sept. 2, 1952 |
| 2,616,159 | Curtis | Nov. 4, 1952 |
| 2,624,378 | DiRosa et al. | Jan. 6, 1953 |
| 2,645,967 | Von Zelewski | July 21, 1953 |
| 2,788,692 | Jentsch et al. | Apr. 16, 1957 |

FOREIGN PATENTS

| | | |
|---|---|---|
| 254,158 | Switzerland | Dec. 1, 1948 |
| 519,686 | Belgium | May 30, 1953 |
| 522,711 | Belgium | Sept. 30, 1953 |
| 1,056,787 | France | Oct. 28, 1953 |